Figure 1:
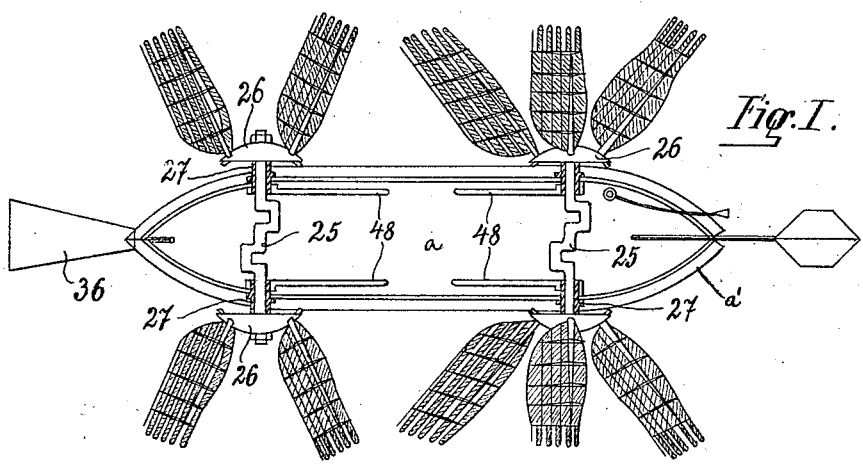

J. SCHÜLKE.
FLYING APPARATUS.
APPLICATION FILED JUNE 4, 1907.

968,700.

Patented Aug. 30, 1910.

3 SHEETS—SHEET 1.

WITNESSES
W. P. Burke
John A. Percival

INVENTOR
Julius Schülke

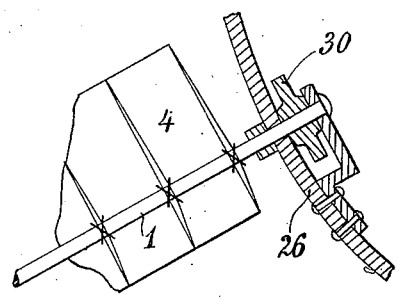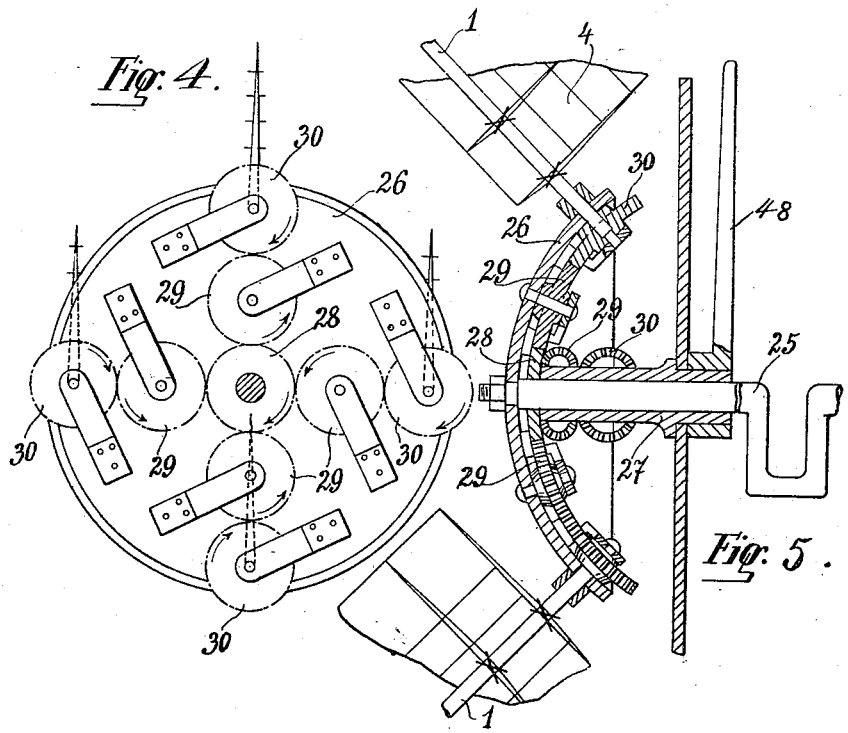

J. SCHÜLKE.
FLYING APPARATUS.
APPLICATION FILED JUNE 4, 1907.

968,700.

Patented Aug. 30, 1910.
3 SHEETS—SHEET 3.

WITNESSES
W. P. Burks
W. J. Smith

INVENTOR
Julius Schülke
BY
[signature]
ATTY

UNITED STATES PATENT OFFICE.

JULIUS SCHÜLKE, OF JENA, GERMANY.

FLYING APPARATUS.

968,700.　　　　Specification of Letters Patent.　　Patented Aug. 30, 1910.

Application filed June 4, 1907. Serial No. 377,232.

*To all whom it may concern:*

Be it known that I, JULIUS SCHÜLKE, subject of the German Emperor, residing at No. 18 Kaiserin Augusta strasse, Jena, Germany, have invented new and useful Improvements in Flying Apparatus, of which the following is a specification.

The apparatus for aerial navigation according to this invention is characterized by the peculiar construction and operation of wings, which are arranged in groups or sets on rotary elements revolving like wheels at the frame-sides of the aerial machine. During the rotation of said elements, the wings are adjusted automatically so as to drive away the air after the manner of paddle wheels and to afford the effective propelling and ascending power for the machine while simultaneously yielding the secondary advantages of an aeroplane machine.

The wing forming part of the subject of the present invention is essentially a flapping wing, that is to say, on the downstroke it beats the air with a blow, and on the upstroke it moves through the air idly, with little or no tendency to depress the machine or act counter to its downstroke. To this end the wing which is of spoon shaped or concave-convex form is provided with strips constituting valve flaps adapted to open only toward the concave or under side, and the wings are arranged in groups and are so actuated that on both the downstroke and the upstroke the concave side of the wing will be downward, while on the downstroke the rearward part of the wing will be tilted somewhat in the manner above referred to. By this mode of construction and operation of the wings, each wing is adapted to attain both lifting and propulsive effects.

Another feature of the wings consists in providing same at their outer ends with elastic blades or vanes corresponding with the primary wing feathers of a bird and so devised that the air can escape idly past them on their upstroke while on their downstroke they resist the upward escape of the air and moreover cause same to pass rearwardly (that is to say, longitudinally of the wing) so as to facilitate propulsion.

The car is closed on its upper side and tapers to the front and to the rear; and on the said upper side there are provided longitudinal guiding surfaces or fins adapted to steady the flight. The flying machine is also provided with a rudder actuated by a device of the well known kind.

Other objects and features of the invention will be hereinafter set forth.

Figure 2:
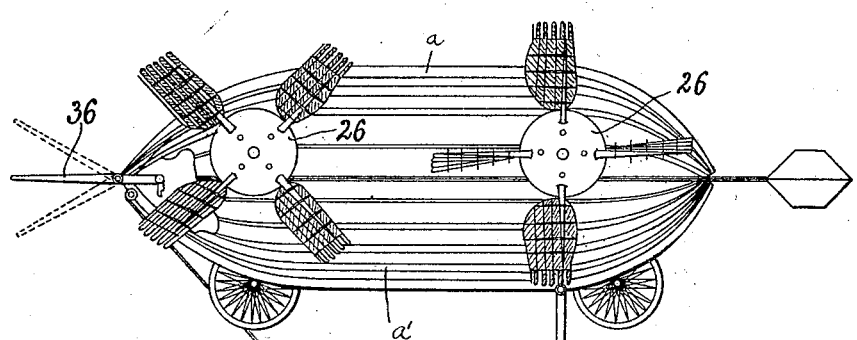
Figure 10:
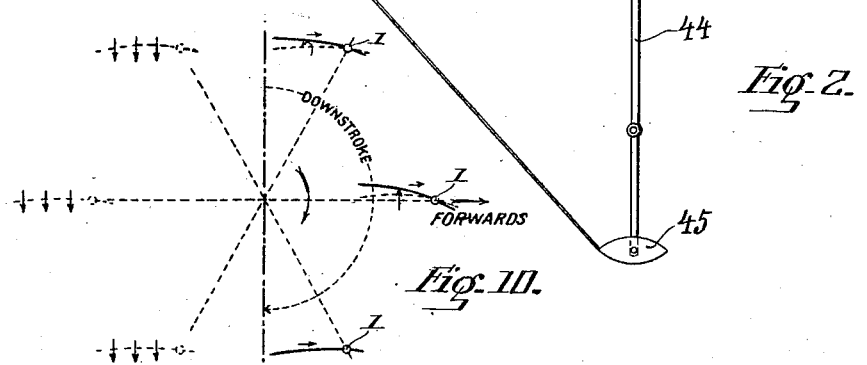
Figure 8:
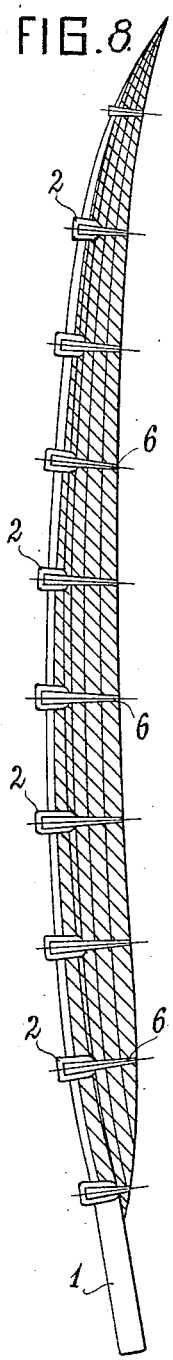
Figure 9:
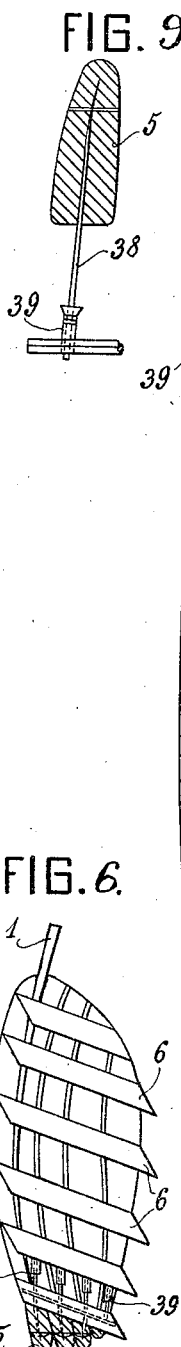
Figure 7:
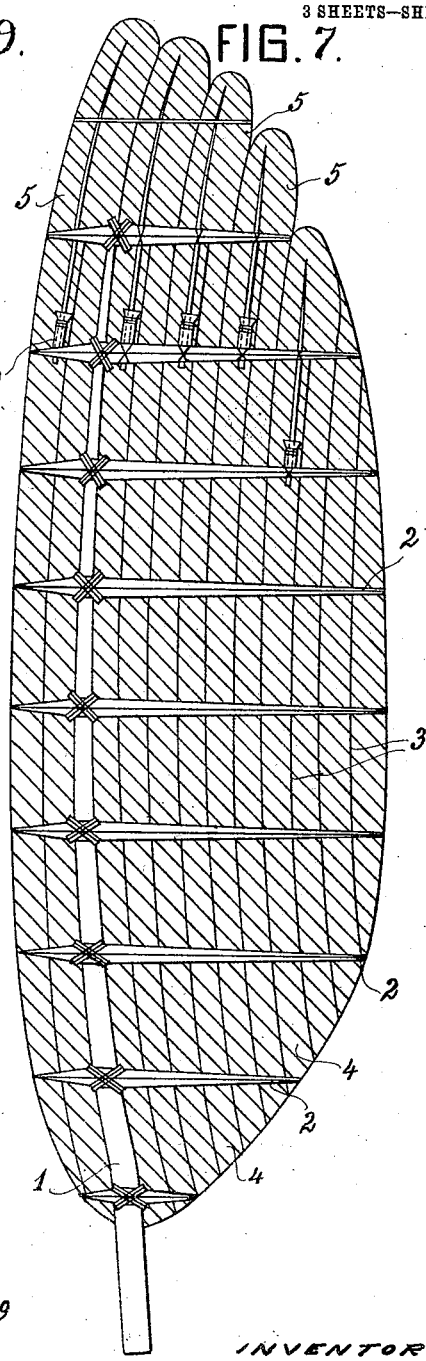
Figure 6:
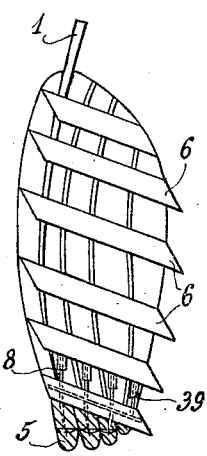

Referring to the accompanying drawings Figures 1–2 are plan and side elevation respectively of a constructional form of the flying apparatus. Figs. 3–5 show the gear of the apparatus between the shaft and wing rod. Fig. 6 is a perspective view showing diagrammatically the arrangement of the parts of one of the wings; Fig. 7 is a plan of the wing on an enlarged scale; Fig. 8 is a longitudinal section of same; Fig. 9 is a detail of the supplemental blade arranged at the ends of the wings similar to a bird's outermost wing feathers; Fig. 10 is a diagram showing in dotted lines the normal position and in full lines the operative position of the wings.

The car or body $a$ (Figs. 1 and 2) of the aerial machine consists of a frame of light material having the form of a ship's hull. Such car is closed at top and tapers at front and rear, as shown, and is provided at its upper part, and also in this instance at its lower part with guiding fins $a'$ to steady the flight of the machine.

The wing propellers are operated by crank shafts 25 disposed horizontally in bearings of the said frame. 26 are the wing carriers each of which is provided with a group of wings circumferentially disposed in such a manner that the main quills 1 of same are disposed askew or form the sides of a cone as shown in Fig. 1.

Each wing (Figs. 6–8) consists of an elastic, bent member or main quill 1 tapering from the shank to the tip and provided with a series of ribs 2 fixed transversely to the quill and also tapering toward the ends. These transverse ribs (shown from the upper side in Fig. 7) are curved in such a manner that their concave side is directed downward and are continued underneath with blades or fins 6 (Fig. 6) which thus extend in the direction of flight. These fins 6 practically prevent the centrifugal ejection of the air in the direction of the main quill. The ribs 2, as shown, are parallel with each other and attached to the main quill, one end extending for about ¼ to ⅓ of its length beyond the quill and the longer end directed rearwardly. By so proportioning the active surfaces of the wings and utilizing the torsional elasticity produced in the main quills, the wings are enabled to assume their appropriate slanting position as hereinafter explained with reference to Fig. 10.

Cords or wires 3 fastened to the transverse ribs extend at equal distances apart parallel to the quill. An overlapping strip 4 of air tight flexible material, or fabric, is attached along each cord by its longitudinal edge, thus forming a valve and the fulcrum of the valve movement being afforded by the cord. Thus the parallel valve-like strips extending from cord to cord are adapted to open automatically during the ascending stroke of the wings and in their open position permit of the passage of air from above, whereas during the descending stroke, they form a large air resisting area when they are closed and rest with their free edges against the cords.

The outermost ends of the wings are provided with small blades or vanes 5 (Fig. 9) after the manner of a bird's primary wing feathers and having the shape, elasticity and other properties of the described large wings. The tapered shanks 38 of these blades are mounted on the outer ribs 2 in suitable sleeves 39 and their torsional elasticity allows the vane a limited tilting movement which takes place when the air resistance acts during the downstroke of the wing. This results from constructing each blade 5 wider rearwardly than forwardly with respect to the quill. The torsional tilting starts at the commencement of each upstroke and downstroke and causes the vane to be adjusted obliquely with respect to the horizontal direction of flight. Thus a propulsive effect takes place in consequence of the torsional stress, which assists the forward propulsion because during the wing stroke the air is driven away rearwardly. Now since owing to the aforesaid valve-like arrangement there is a small resistance of air during the wing up-stroke but during the down-stroke a large resistance of air in consequence of the large concave surfaces, the power for producing the movement of the wing is utilized in a most effective manner for the ascent as well as for the forward propulsion of the aerial machine. The forward propulsion is created by the aforesaid proportioning of the active surface of the wing (Fig. 10). Fig. 10 represents diagrammatically the circular course of a group of wings radiating conically (as hereinafter explained in detail) with their main quills from one common driving hub. The wider surface rearwardly of the main quill causes each wing in the downstroke (Fig. 10, on the right) to tilt into that rearward oblique position, wherein a component force is derived from the air repulsion, in the forward direction as indicated by arrows.

The movement of the wings is derived from the crank shafts 25, which are driven by any suitable motor. The stability of the aerial machine for maintaining the horizontal position of the said shafts is established by suitable means: for example, according to the drawing (Fig. 2) a vertically swinging rod 44 is connected with the frame $a$ and carries a balance weight 45. The articulation of the rod 44 and weight 45 permits a lifting movement thereof so that these means may be raised or lowered as required, in the well known way.

A set of wings is provided on each of the rotary carrier elements 26 fixed at the ends of the crank shaft 25 (Fig. 5). The shank of each wing quill 1 is journaled in a suitable bearing on the carrier, the axis of which is oblique to the axis of the crank shaft. Thus in the rotating movement of the carrier 26, the quills 1 describe the enveloping surface of a cone. During this rotation, the wings must each be revolubly adjusted so that they maintain the suitable position for presenting their air resisting area mainly in the downstroke. The constructional form according to Figs. 3, 4 and 5 comprises an epicyclic gear consisting of pinions 30 fixed to the shank of each wing and epicyclic pinions 29 journaled on the carrier 26 and meshing with a central gear wheel 28. The latter may be fixed or adjustably secured to the frame. By this epicyclic gear, the faces of the wings are kept in an approximately horizontal position presenting their front edges in the direction of the flight. Owing to this construction, it is possible to imitate the natural movement of the bird's wing in such a manner that the downward propulsive stroke takes place simultaneously with a forward gripping action, trials having shown that by this operation a much stronger effect is attained than that with wings actuated simply with up and down strokes.

If the central pinions 28 are secured to the ends of bearing sleeves 27 and the latter are connected (inside the frame $a$) with suitable adjusting levers 48 (Fig. 5) it is possible to adjust the gearing so that the position maintained by the wings more or less deviates from the normal horizontal position. Thus the inclined forward position would produce a propelling action concurrently with the lifting effect and the degree and proportion of both effects may be varied at will. It is understood that the aforesaid intermediate epicyclic wheels 29 are loosely mounted on their shafts and engage the driving pinions 30 as well as the central pinion 28 of the same size. As soon as the crank shafts 25 are rotated, the wing carriers 26 also rotate and the pinions 29 are caused to roll around and derive motion from the central pinions 28, thus transmitting rotation to the pinions 30 of the wing quills 1. The latter will obviously be rotated in an opposite direction to the pinions 29. By this reversal of the direction of rotation, the action of the crank shaft rotation for the wings will be annulled and consequently the wing faces maintain their relative positions, no matter whether the wings are located above or below, in front of or behind the center of the crank shaft. The direction of rotation is indicated by the arrows. As the normal position of all of the wings is horizontal or approximately so, the wings combined form a kind of aeroplane which is effective even in the event of the non-rotation of the apparatus. Of course, in order to increase the floating capacity of the aerial machine, the frame may be provided with a supplemental aeroplane contrivance above the body thereof.

If the wing faces are set in a sloping position forwardly in the direction of flight, the effect is more in favor of a lifting action and in the reverse sloping position they produce the aforesaid effect of combined lifting and forward propulsion—thus according to the adjustment by means of the lever 48, the effect may be selected at will. If the apparatus is at the required altitude all available motive power may be employed for forward propulsion. Although the automatic adjusting gear maintains all wing faces practically edgewise of the direction of flight, it is obvious that they do not assume parallel positions owing to the divergence of the wing quills 1 radiating from the cone center.

The navigator may either adjust all the sets of wings or any individual set of wings may be adjusted. This is in favor of the adaptability of the whole apparatus to any emergency, an adjustment being possible for a direction upward and downward and rearward. For an unsymmetrical position of the set of wings with respect to the right and left sides, the apparatus would describe a curve with a larger or smaller radius according to the adjustment of the levers.

The apparatus could be turned on the spot if the front set of wings and rear set of wings are correspondingly adjusted, i. e., in such a manner that the one set of front wings and the one set of rear wings of the other side are reversed.

Having now particularly described and ascertained the nature of my said invention and in what manner the same is to be performed, I declare that what I claim is:—

1. An aerial machine comprising propelling wings arranged in groups, said wings being of concavo-convex form, means for operating said wings, means for holding said wings so that the concave sides are downward on both the down stroke and the up stroke, valve flaps on the wings opening downwardly, means for allowing the rearward part of the wings to tilt upwardly on the down stroke, and guide faces underneath the wings extending in the direction of flight across said wings, whereby the air is prevented from being ejected by centrifugal force in the direction of the main quill.

2. An aerial machine comprising propelling wings of concavo-convex form arranged in groups, valve flaps on said wings opening downwardly, means for operating said wings, means for keeping the concave sides of the wings downward on both the down stroke and the up stroke, the outer tips of the wings comprising axially movable vanes, the quills of which have their shanks capable of a torsional tilting and said vanes having a wider area behind than in front so that during the down stroke the vanes assume a downward slanting position and assist the forward propulsion.

In testimony whereof I have signed my name to this specification in the presence of two subscribing witnesses.

JULIUS SCHÜLKE.

Witnesses:
LUDWIG OPITZ DOGOSGAKAR,
ELIZABETH OPITZ.